United States Patent
Jeon

(10) Patent No.: US 6,677,980 B1
(45) Date of Patent: Jan. 13, 2004

(54) METHOD AND APPARATUS FOR CORRECTING GAZE OF IMAGE USING SINGLE CAMERA

(76) Inventor: Byeung-Woo Jeon, 303-902, Yangjmaul, 27 Sunae-dong, Bundang-gu, Songnam-city, Gyunggi-do (KR)

( * ) Notice: Subject to any disclaimer, the term of this patent is extended or adjusted under 35 U.S.C. 154(b) by 222 days.

(21) Appl. No.: 09/710,270

(22) Filed: Nov. 10, 2000

(30) Foreign Application Priority Data

Nov. 10, 1999 (KR) ............................................. 99-49805

(51) Int. Cl.$^7$ .................................................. H04N 7/14
(52) U.S. Cl. ................................ 348/14.16; 348/14.01; 382/100
(58) Field of Search ........................... 348/14.01, 14.08, 348/14.09, 14.16, 169; 382/100, 103, 118

(56) References Cited

U.S. PATENT DOCUMENTS 5,500,671 A * 3/1996 Andersson et al. ...... 348/14.16

FOREIGN PATENT DOCUMENTS

JP 360246480 A * 12/1985 ........... G06F/15/62

* cited by examiner

*Primary Examiner*—Melur Ramakrishnaiah
(74) *Attorney, Agent, or Firm*—F. Chau & Associates, LLP

(57) ABSTRACT

A method and apparatus for correcting a gaze of an image using a single camera, corrects an image so that a communication familiarity can be enhanced by letting the eyes meet in a video communications system such as a video phone or video conference with a single camera. The input image from the camera is analyzed to determine a gaze deviation value formed between the viewing direction toward the camera and the object viewing direction. In order to obtain a gaze corrected image with respect to the image captured by the camera, a corresponding point coordinate of the input image corresponding to a particular coordinate value of the corrected image is calculated and then a pixel value of the corrected image corresponding to the calculated coordinate is obtained using the input image from the camera. Thus, the eyes can be met with the other party with a single camera, to thereby enhance familiarity of the video communication.

19 Claims, 6 Drawing Sheets

METHOD AND APPARATUS FOR CORRECTING GAZE OF IMAGE USING SINGLE CAMERA

BACKGROUND OF THE INVENTION

1. Field of the Invention

The present invention relates to method and apparatus for correcting a gaze of an image captured by a camera in a video phone or a video conference system, and more particularly, to a method and apparatus for correcting a gaze so that the direction of a gaze of an image of an object captured by a single camera meets that of the other party who watches the image and communicates with the object.

2. Description of the Related Art

In general, in case of a video communications system such as a video phone or video conference, a camera is attached to an apparatus having the form of a conventional telephone set, to obtain a facial image of the other party. Otherwise, a camera is located on the upper end of a monitor of a computer, in order to use a computer system as a video phone, to thereby obtain a facial image of the other party. An example using the computer system is shown in FIG. 1.

In FIG. 1, a camera 1 capturing the image of a user is located on a monitor 2 of the computer system. Here, a direction 3 of the camera 1 is directed to a user 5. The user 5 gazes at the center of the monitor 2, not toward the camera 1, in order to watch the face of the other party displayed on the monitor 2. For this reason, an image containing the face of the user 5 photographed via the camera 1 is viewed by the other party as illustrated in FIG. 2. That is, the gaze of the image is downwards, and does not meet that of the other party. This greatly reduces reality of the video phone featuring face-to-face talking. Even though the camera 1 is located on the lower portion or lateral portion of the monitor 2, instead of the upper portion thereof, the above-described problem of poor eye contact cannot be avoided. Unless the camera 1 is located on the center of the monitor 2, that is, a corresponding position of the monitor 2 in which the face of the other party is viewed, the above problem always remains so that the gaze 4 of the object captured by the camera 1 does not meet that of the camera 1. Even if the video communications system is constructed to have the form of a telephone set other than that of the computer system, the direction of the gaze by the user is not directed toward the camera, but toward the corresponding portion of the monitor on which the face of the other party is displayed, to accordingly cause the same problem.

SUMMARY OF THE INVENTION

To solve the above problems, it is an object of the present invention to provide a method for correcting a gaze of an image of an object, in which a gaze deviation between the gaze direction toward a camera and that of an object is determined and then the image obtained by the camera is modified using the determined gaze deviation, in the form that the object seems to gaze at the camera.

It is another object of the present invention to provide an apparatus for embodying an image gaze correction method using a single camera.

To accomplish the above object of the present invention, there is provided a method for correcting a gaze of an image using a single camera, the method for correcting a gaze of an image received from the camera comprising the steps of: (a) determining a gaze deviation value to correct a gaze; (b) calculating a corresponding point coordinate of an input image corresponding to a particular position in a corrected image using the gaze deviation value determined in step (a); (c) calculating a pixel value at the calculated corresponding point coordinate using the input image from the camera; and (d) outputting a gaze corrected image by using the pixel value calculated in step (c) as the pixel value of the particular position of the corrected image.

There is also provided an apparatus for correcting a gaze of an image using a single camera, the apparatus for correcting a gaze of an image received from the camera comprising: a gaze deviation determiner for determining a gaze deviation value for correcting a gaze; a corresponding point coordinate calculator for receiving the gaze deviation value determined in the gaze deviation determiner and a particular coordinate value of the corrected image in a pixel value calculator and outputting a corresponding point coordinate value of the input image from the camera in correspondence to the coordinate value of the input corrected image; and a pixel value calculator for outputting a pixel value of the corrected image corresponding to the particular coordinate of the corrected image using the input image from the camera.

BRIEF DESCRIPTION OF THE DRAWINGS

The above objects and other advantages of the present invention will become more apparent by describing the preferred embodiment thereof in more detail with reference to the accompanying drawings in which.

DETAILED DESCRIPTION OF THE INVENTION

A preferred embodiment of the present invention will be described with reference to the accompanying drawings.

Figure 1:
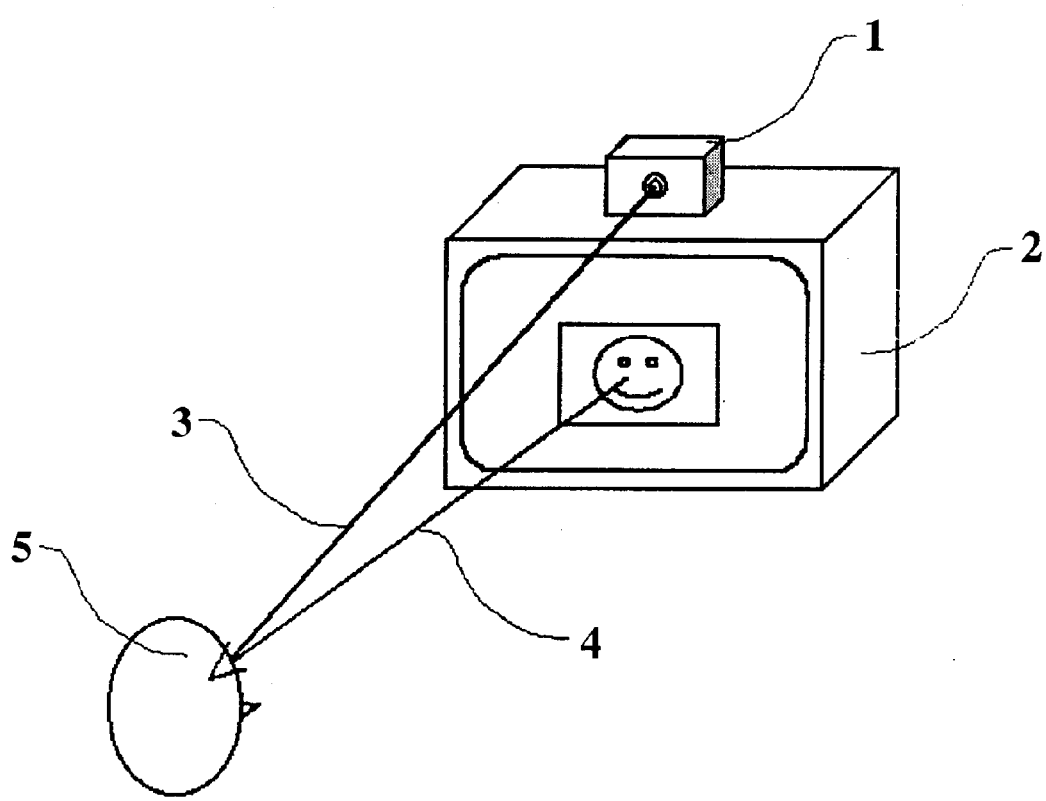
FIG. 1 shows an example of a video phone system using a general computer system.
Figure 2:
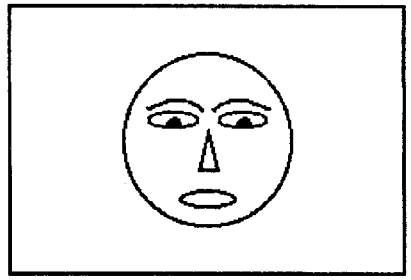
FIG. 2 illustrates an image whose gaze does not meet that of the other party.
Figure 3:
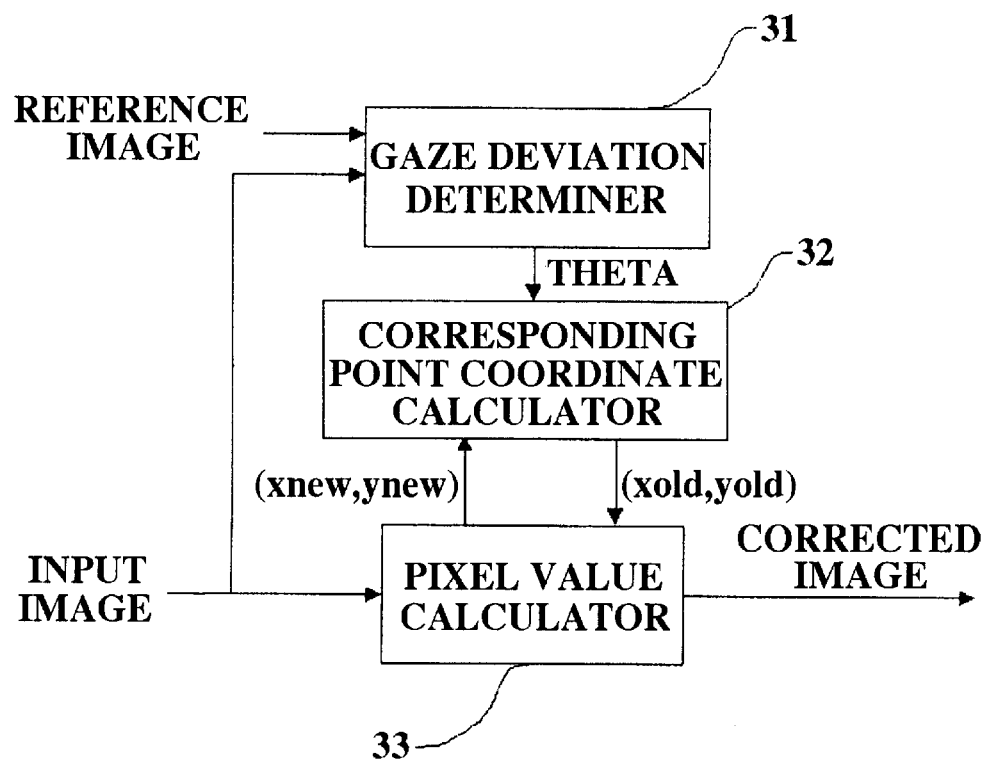
FIG. 3 is a block diagram showing an image gaze correction apparatus using a single camera according to the present invention.

Referring to FIG. 3, the apparatus shown in FIG. 3 includes a gaze deviation determiner 31 for determining a gaze deviation between the gaze directions toward a camera and that of an object, and a corresponding point coordinate calculator 32 for calculating a corresponding point coordinate of the input image in correspondence to a particular coordinate value of a corrected image, using the determined gaze deviation. The FIG. 3 apparatus also includes a pixel value calculator 33 for calculating a new pixel value corresponding to the calculated coordinate using the input image and outputting a gaze-corrected image. The operation of obtaining a gaze-corrected image in the FIG. 3 apparatus having the above-described structure will be described in detail with reference to FIGS. 4 through 9.

Figure 5:
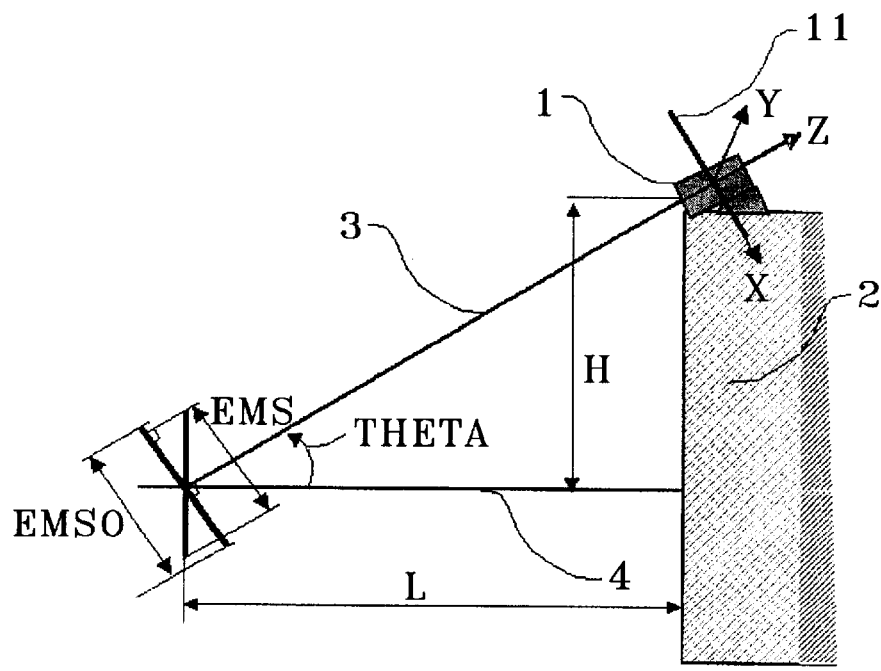
FIG. 5 is a conceptual view showing a gaze deviation between the gaze directions of a camera and an object.

In an embodiment of the present invention, the camera 1 used for video communications is installed on the monitor 2 in the direction 3 of the camera 1 as shown in FIG. 5. The user being the object gazes at the center of the monitor 2 in the direction of a line 4 in order to watch the face of the other party displayed on the monitor 2.

The gaze deviation determiner 31 defines an angle between the optical axis 3 of the camera 1 and the gaze 4 of the user as a gaze deviation, and determines a gaze deviation value, that is, an angle THETA of FIG. 5. Here, the gaze deviation value THETA is obtained as in the following equation 1 in the case that a distance L between the object and the monitor 2 and a height H from the object to the camera 1 are known.

$$\text{THETA} = \arctan(H/L) \quad (1)$$

Figure 4:
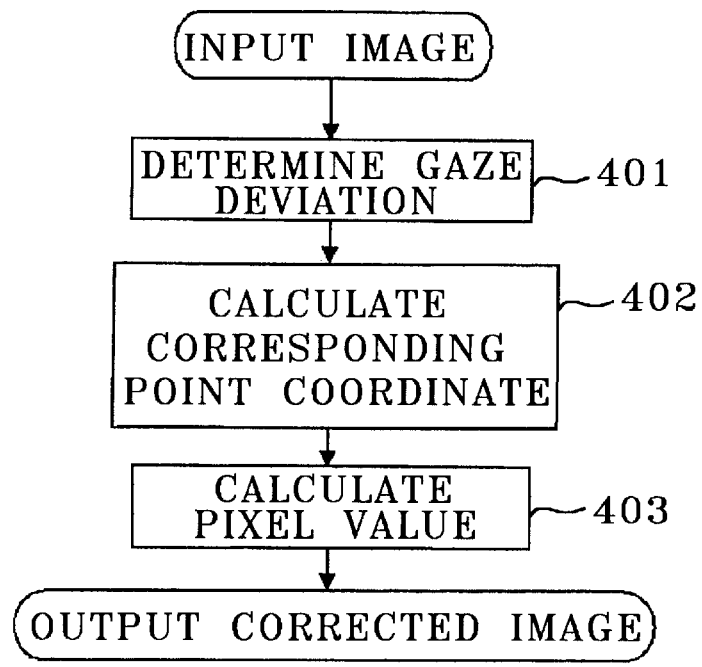
FIG. 4 is a flowchart view for explaining an image gaze correction method according to the present invention.
Figure 6A:
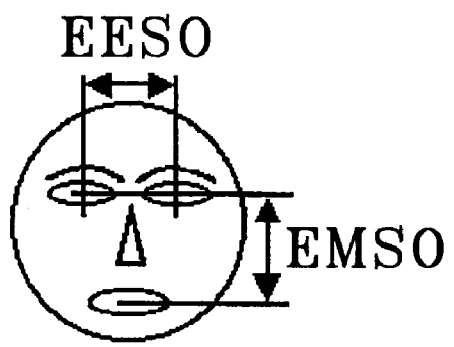
FIGS. 6A and 6B illustrate facial features according to a video analysis.
Figure 6B:
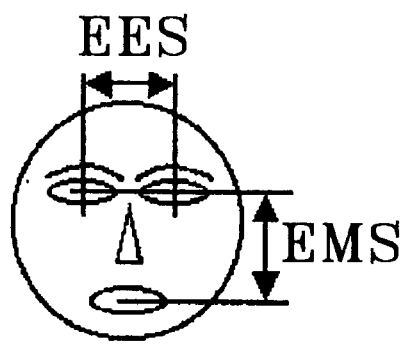

However, if both or either one of the distance (L) and the height (H) are not known, the gaze deviation determiner 31 analyzes an input image captured by the camera 1 and a reference image and then determines a gaze deviation value THETA (step 401 of FIG. 4). In more detail, the object is directed to the direction 3 of the camera 1 at an initial state or at a user's desire, to obtain a reference image. In the case of the reference image, the direction 3 of the camera 1 and the gaze direction 4 of the object are met with each other. The reference image is analyzed to extract the two pupils and the mouth. Then, as shown in FIG. 6A, a distance EMS0 between the line connecting the centers of the two pupils and the center line of the mouth, and a distance EES0 between the center of the two pupils are obtained. Meanwhile, the image captured via the camera 1 is analyzed at the normal state where the object watches the screen of the monitor 2, to extract the two pupils and the mouth. Then, as shown in FIG. 6B, a distance EMS between the line connecting the centers of the two pupils and the center line of the mouth, and a distance EES between the center of the two pupils are obtained. In the case of the reference image where the direction 3 of the camera 1 and the gaze direction 4 of the object coincide, and in the case of the input image at the general state where both the directions differ by the gaze deviation value THETA as shown in FIG. 5, a length of the object acquired on a video plane 11 of the camera 1 differs from the other. The ratio is expressed by the following equation (2).

$$\cos(\text{THETA}) \times EMS0/EES0 = EMS/EES \quad (2)$$

Thus, the gaze deviation determiner 31 obtains EMS0 and EES0 from the reference image and EMS and EES from the currently input image at the general state, respectively. Then, using the equation (2), the gaze deviation value THETA can be obtained. Here, the reason why normalized values EES0 and EES are used without using only EMS0 and EMS corresponding to the length of the object, is to obtain a gaze deviation value THETA reliably, even in the case that the distance between a camera and an object differs from each case when a reference image is photographed and when a current input image of a normal state is photographed. In the above equation (2), in order to obtain EES, EES0, EMS, and EMS0, the gaze deviation determiner 31 should analyze the input image and find the eyes and mouth. This can be sufficed by the known technology disclosed in a reference entitled "Automatic Generation of the Personal 3D Face Model" Korean Electronics Engineering Association Vol. 36, S edit, No. 1, January 1999, S.-J. Ham and H.-G. Kim, pp. 104 114. It is natural that the present invention should not be limited to a particular method of finding the eyes and mouth of an object. Also, the present invention can be realized in various forms matching the purpose of determining a gaze deviation value. As an example, the present invention can be realized in the form that a user adjusts a gaze deviation value THETA in a way that the adjusted gaze deviation value generates the most natural corrected image in view of the user.

Figure 7A:
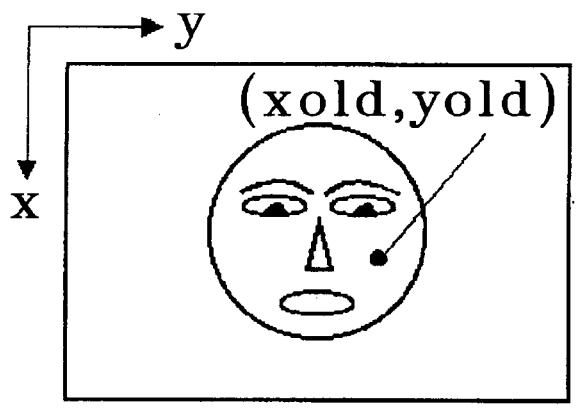
FIGS. 7A and 7B illustrate a corresponding point coordinate of the input image and the corrected image, respectively.
Figure 7B:
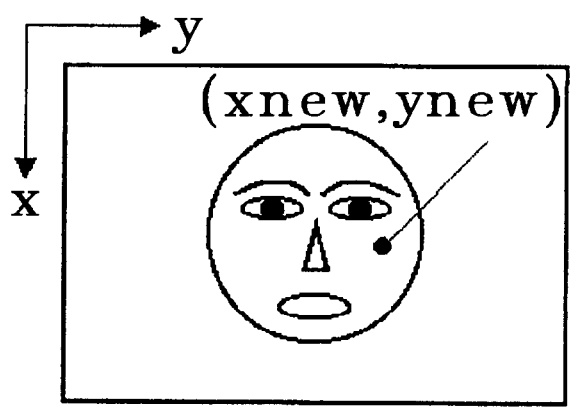

The corresponding point coordinate calculator 32 receives the gaze deviation value THETA determined by the gaze deviation determiner 31, receives a coordinate value (xnew, ynew) with respect to a particular position of the corrected image from the pixel value calculator 33, and calculates a corresponding point coordinate of the input image corresponding to the position of the corrected image (step 402 of FIG. 4). That is, the corresponding point coordinate calculator 32 calculates a corresponding point coordinate (xold, yold) of the input image of FIG. 7A that is an image existing before rotation in correspondence to a particular position (xnew, ynew) of an image of FIG. 7B that is virtually rotated by the gaze deviation value THETA, in order to obtain a corrected image by rotating the image captured by the camera by the gaze deviation value THETA centered on the y-axis, at the normal state where the object watches the monitor screen. The corrected image can be obtained by rotating the whole of the input image or only a part of the input image containing such as eyes. Also, the range of the particular position (xnew, ynew) can be either the whole image or a part within the image. Here, x, y, and z axes mean the coordinate system on the camera video plane 11 as shown in FIG. 5. Further, the x axis and the y axis represent a vertical direction and a horizontal direction of the image captured by the camera 1 as shown in FIGS. 7A and 7B, respectively. The z axis represents the direction toward the camera 1 from the object. Here, the object is defined as at z=0. The corresponding point coordinate calculator 32 obtains a corresponding point coordinate (xold, yold) by the following equation (3).

$$xold = \cos(\text{THETA}) \times xnew + z(xnew, ynew) \times \sin(\text{THETA})$$
$$yold = ynew \quad (3)$$

Figure 8:
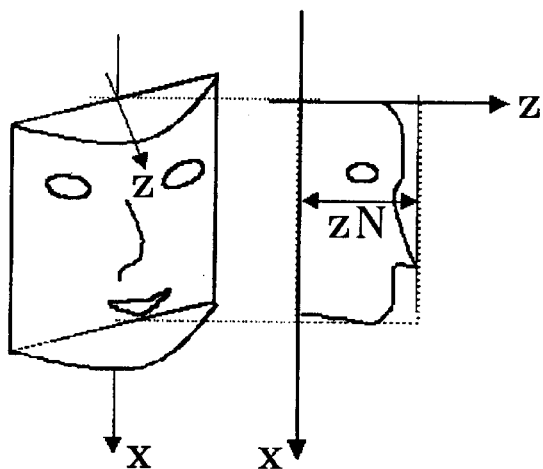
FIG. 8 is a view for explaining a modelling of an object face in order to calculate a corresponding point coordinate.
Figure 9:
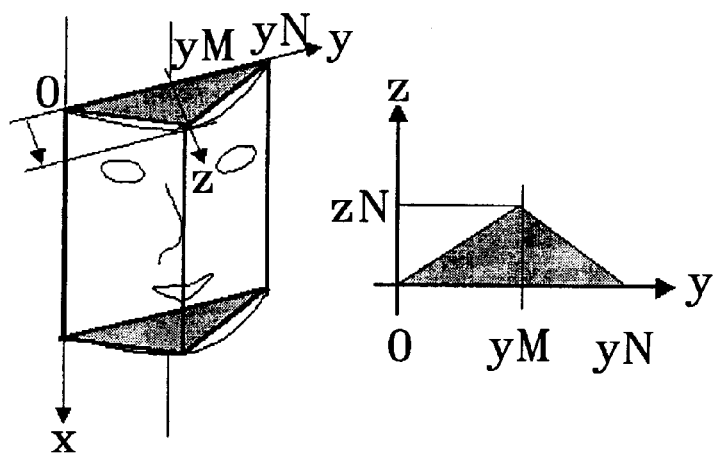
FIG. 9 is illustrates a triangular column model of the human face.

Since the currently input image is rotated by the gaze deviation value THETA centered on the y axis, the value on the x axis is varied and the value on the y axis is same. In the above equation (3), a value of z(xnew, ynew) is a z value of a point on the object corresponding to the pixel located at (xnew, ynew). As shown in FIG. 8, this occurs owing to the difference of the height of the face in the z direction. Since the image photographed by the camera 1 is a two-dimensional image, the z axis information cannot be recoverable with only the image itself. However, a simple model can be used as shown in FIGS. 8 and 9, in order to calculate the z axis information. In FIGS. 8 and 9, zN is a distance from the x axis to the nose when the highest point in the face in the z direction is modelled as the nose. That is, as shown in FIG. 9, the face is approximated into a triangular column. Accordingly, a z value at a certain coordinate (x, y) without actual information about a correct shape of the face itself can be expressed as the following equation (4).

$$z = g(x, y) \quad (4)$$

Here, although a function g(x, y) should be determined by a correct analysis of the shape of the face, it is acceptable to use such a simple function for practical use. As an example, the function g(x, y) is approximated as a triangular column as shown in FIG. 9 and can be expressed as the following equation (5).

$$g(x, y) = (zN/yM) \times y, \quad 0 < y < yM \quad (5)$$
$$= zN, \quad y = yM$$
$$= -zN/(yN - yM) \times (y - yM) + zN, \quad yM < y < yN$$

The corresponding point coordinate calculator 32 calculates a corresponding point coordinate of the input image corresponding to the coordinate point of the corrected image in association with the equations (3) through (5), and can be realized in various forms matching the purpose of calculating a corresponding point coordinate (xold, yold). The corresponding point coordinate calculator 32 outputs the calculated corresponding point coordinate (xold, yold) to the pixel value calculator 33.

The pixel value calculator 33 calculates a pixel value corresponding to the corresponding point coordinate (xold, yold) calculated by the above equation (3) using the input image from the camera 1 (step 403 of FIG. 4). If the x-coordinate of the corresponding point (xold) has an integer, the pixel value calculator 33 has only to find a pixel value at the coordinate (xold, yold) among the pixel values input from the camera 1. However, by the above equation (3), the x-coordinate of a corresponding point (xold) has a real value in general. In this case, the pixel value can be calculated using an interpolation, whose example follows. If the value of the x-coordinate of a corresponding point (xold) is divided into an integer part (xold_int) and a non-negative fraction part (xold_frac), the fraction part (xold_frac) becomes a certain positive number between 0 and 1. Here, the pixel value at the corresponding point coordinate (xold, yold) is expressed as the following equation (6).

$$f(xold, yold) = (1 - xold\_frac) \times f(xold\_int, yold) + xold\_frac \times f(xold\_int+1, yold) \quad (6)$$

Here, the function f(x, y) means a pixel value at a coordinate (x, y).

The pixel value calculator 33 uses the calculated pixel value as the pixel value at a coordinate (xnew, ynew) of a position corresponding to the corrected image. In this embodiment, although the pixel value is calculated by the above equation (6), other specific embodiments matching the purpose of calculating the pixel value at a coordinate (xnew, ynew) can be used.

As described above, if the gaze deviation determiner 31 determines the gaze deviation value THETA that is an angle between the gaze toward the camera and the gaze of the object, the corresponding point coordinate calculator 32 can calculate the corresponding point coordinate of the input non-corrected image from the camera in correspondence to a particular point, and the pixel value calculator 33 can obtain the pixel value at the calculated corresponding point, in order to obtain a pixel value corresponding to the particular point of the corrected image that is an image with respect to an object virtually rotated by the gaze deviation value THETA, to thereby finally obtain a gaze corrected image.

It is apparent to a person skilled in the art that the present invention can be modified in various forms, other than the above-described embodiment.

As described above, the method and apparatus for correcting a gaze of an image using a single camera according to the present invention, corrects a gaze mismatch problem caused by the fact that the gaze toward a camera and a gaze of an object do not coincide in a video communications system capable of performing a real-time, on-line face-to-face communication such as a video phone or video conference, and provides an effect of greatly enhancing familiarity and realism of the applications of performing a virtual face-to-face communication by enhancing eye-to-eye contact.

What is claimed is:

1. A method for correcting a gaze of an image using a single camera, the method for correcting a gaze of an image received from the camera comprising the steps of:

(a) determining a gaze deviation value to correct a gaze;

(b) calculating a corresponding point coordinate of an input image corresponding to a particular position in a corrected image using the gaze deviation value determined in step (a);

(c) calculating a pixel value at the calculated corresponding point coordinate using the input image from the camera; and (d) outputting a gaze corrected image by rotating the input image by the determined gaze deviation value using the pixel value calculated in step (c) as the pixel value of the particular position of the corrected image.

2. The gaze correction method of claim 1, wherein in said step (a) the input image from the camera and a reference image is compared to determine a gaze deviation value corresponding to the currently input image.

3. The gaze correction method of claim 2, wherein in said step (a) the reference image is obtained when the gaze of an object is toward the camera.

4. The gaze correction method of claim 2, wherein in said step (a) the reference image and the input image are analyzed and the thus-obtained features are compared.

5. The gaze correction method of claim 4, wherein said step (a) comprises the sub-steps of:

(a1) analyzing the reference image and the input image and extracting the two pupils and mouth;

(a2) obtaining distances (EMS0, EMS) between the line connecting the centers of the two pupils and the center line of the mouth, and distances (EES0, EES) between the center of the two pupils, respectively; and (a3) determining a gaze deviation value using the distances obtained in step (a2).

6. The gaze correction method of claim 5, wherein said sub-step (a3) determines the gaze deviation value THETA according to the following equation:

$$\cos(THETA) \times EMS0/EES0 = EMS/EES.$$

7. The gaze correction method of claim 1, wherein in said step (a) the gaze deviation value is determined by a user.

8. The gaze correction method of claim 1, wherein the gaze deviation value in said step (a) is an interposing angle between the direction where an object views the camera and the direction where the object views the monitor screen.

9. The gaze correction method of claim 8, wherein said step (a) determines the gaze deviation value THETA according to the following equation in the case that the distance between the object and the monitor screen is "L", and the height from the object to the camera is "H"

$$THETA = \arctan(H/L).$$

10. The gaze correction method of claim 1, wherein the corrected image of said step (b) is an image obtained by rotating only a particular region of said input image by said determined gaze deviation value.

11. The gaze correction method of claim 1, wherein said particular position of said step (b) covers the whole of an image.

12. The gaze correction method of claim 1, wherein said particular position of said step (b) covers a part of the image.

13. The gaze correction method of claim 1, wherein said step (b) calculates a corresponding point coordinate (xold, yold) of the input image corresponding to a particular position (xnew, ynew) of the corrected image, based on the following equation $$xold = \cos(THETA) \times xnew + z(xnew, ynew) \times \sin(THETA)$$

$$yold = ynew$$

in which z(xnew, ynew) is a z-value of a point on the object corresponding to a pixel located at the coordinate (xnew, ynew).

14. The gaze correction method of claim 13, wherein the z axis value in said step (b) is obtained through a face modelling.

15. The gaze correction method of claim 14, wherein said step (b) approximates the face in the triangular column to model the face.

16. An apparatus for correcting a gaze of an image using a single camera, the apparatus for correcting a gaze of an image received from the camera comprising:

a gaze deviation determiner for determining a gaze deviation value for correcting a gaze;

a corresponding point coordinate calculator for receiving the gaze deviation value determined by the gaze deviation determiner and a particular coordinate value of a corrected image from a pixel value calculator and outputting a corresponding point coordinate value of an input image from the camera in correspondence to the coordinate value of the input corrected image; and the pixel value calculator for rotating the input image by the determined gaze deviation value and outputting a pixel value of the corrected image corresponding to the particular coordinate of the corrected image using the input image from the camera.

17. The gaze correction apparatus of claim 16, wherein said gaze deviation determiner receives the image from the camera.

18. The gaze correction apparatus of claim 16, wherein said gaze deviation determiner receives a particular gaze deviation value from a user.

19. The gaze correction apparatus of claim 16, wherein said corrected image is obtained by rotating a part of said input image by said gaze deviation value.

* * * * *